US006779967B2

United States Patent
Friedl et al.

(10) Patent No.: US 6,779,967 B2
(45) Date of Patent: Aug. 24, 2004

(54) DEVICE FOR AIR MASS FLOW CONTROL

(75) Inventors: Winfried-Hagen Friedl, Berlin (DE); Joerg Au, Berlin (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 67 days.

(21) Appl. No.: 10/316,930

(22) Filed: Dec. 12, 2002

(65) Prior Publication Data

US 2003/0161719 A1 Aug. 28, 2003

(30) Foreign Application Priority Data

Dec. 12, 2001 (DE) .......................................... 101 60 996

(51) Int. Cl.[7] .............................................. F01D 17/00
(52) U.S. Cl. ........................................ 415/26; 415/116
(58) Field of Search ................................. 415/115, 116, 415/117, 26, 28, 47, 49, 50, 146, 147; 137/111, 114

(56) References Cited

U.S. PATENT DOCUMENTS

| 4,462,204 A | 7/1984 | Hull |
| 4,807,433 A | 2/1989 | Maclin et al. |
| 4,815,928 A | 3/1989 | Pineo et al. |
| 4,841,726 A | 6/1989 | Burkhardt |
| 5,779,436 A | 7/1998 | Glezer et al. |
| 6,202,403 B1 | 3/2001 | Laborie et al. |

FOREIGN PATENT DOCUMENTS

| DE | 3540943 | 5/1987 |
| DE | 19734216 | 2/1998 |
| DE | 19829398 | 1/2000 |
| DE | 19961383 | 6/2001 |
| GB | 1479599 | 7/1977 |
| GB | 2015085 | 9/1979 |
| GB | 2046363 | 11/1980 |
| GB | 2103289 | 2/1983 |
| GB | 2160929 | 1/1986 |
| GB | 2170865 | 8/1986 |
| GB | 2339013 | 1/2000 |
| GB | 2357552 | 6/2001 |

*Primary Examiner*—Edward K. Look
*Assistant Examiner*—Kimya N McCoy
(74) *Attorney, Agent, or Firm*—Davidson Berquist Klima & Jackson LLP

(57) ABSTRACT

A device for air mass flow control in a gas turbine engine includes at least one inlet duct 1, which can issue into an air duct 2, a counter-pressure duct 3, and a double-action shut-off element, which is connected between the counter-pressure duct 3 and the inlet duct 1 and is responsive to pressure differences between the two ducts to control air flow in the air duct 2.

18 Claims, 2 Drawing Sheets

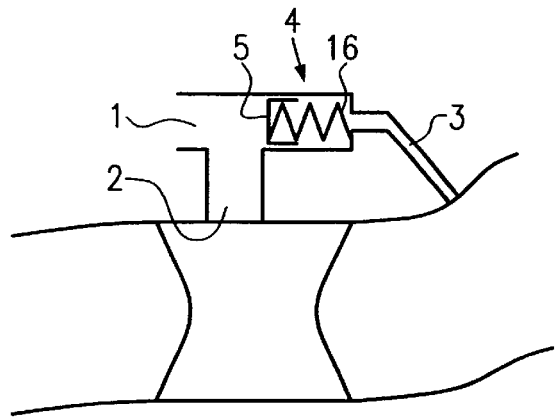
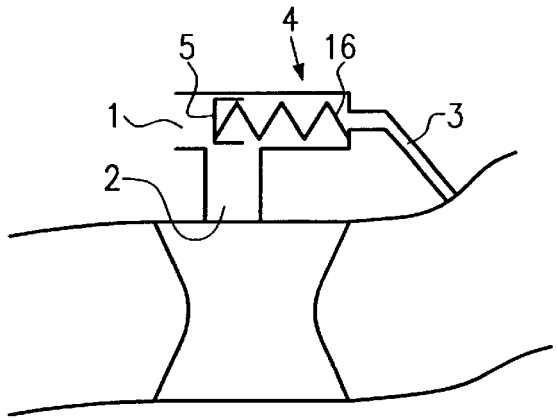
Fig.2          Fig.3
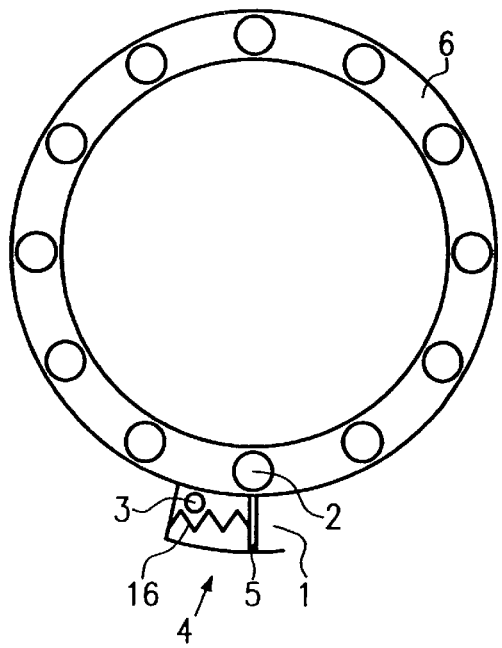
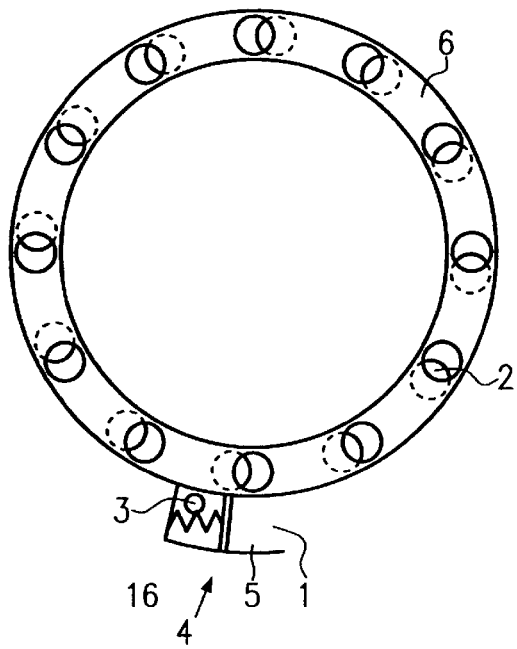
Fig.4          Fig.5

DEVICE FOR AIR MASS FLOW CONTROL

This application claims priority to German Patent Application DE10160996.5, filed Dec. 12, 2001, the entirety of which is incorporated by reference herein.

BACKGROUND OF THE INVENTION

This invention relates to a device for air mass flow control.

The provision of air systems, in particular cooling-air systems for gas turbines, is known from the state of the art. These systems, in particular those provided for cooling purposes in the hot section of the engine, are dimensioned or designed such that they give adequate cooling also under the most adverse conditions, for example at maximum power and the associated highest temperature ranges.

Many of these air systems are not designed adaptively, which results in excessive air mass flow and overcooling under part-load operating conditions or operating conditions requiring lesser cooling. As a consequence, a larger air mass than actually required is supplied to the turbine.

Disadvantageously, with an excessive cooling-air mass being taken from the compressor, the efficiency of the gas turbine is compromised. This decreased efficiency leads to an increase of the specific fuel consumption of the gas turbine, with the consequence that costs increase and the aircraft range is reduced.

Designs are known in state of the art in which valve elements, flaps or similar de-vices provided in the respective air ducts can be opened or closed by means of a separately controlled or governed actuator. Reference is here made to the U.S. Pat. Nos. 4,462,204 and 4,807,433, as well as U.S. Pat. No. 6,202,403, for example. These arrangements, however, incur high manufacturing effort and operational complicacy due to the necessity for appropriate governing or controlling means.

BRIEF SUMMARY OF THE INVENTION

In a broad aspect, the present invention provides a device for air mass flow control that, while being simply designed and easily and safely operable, is self-controlling and enables the cooling-air mass flows to be accommodated automatically.

It is a particular object of the present invention to provide means for the solution of the above problem by the present invention featuring the characteristics described herein, with further advantages and aspects of the present invention becoming apparent from the description below.

The present invention accordingly provides a device for air mass flow control with at least one inlet duct which issues into an air duct or the like. The present invention furthermore provides for a counter-pressure duct which is located downstream of the mouth of the inlet duct and branches off from the air duct.

The present invention also covers a double-acting shut-off element that is connected between the counter-pressure duct and the inlet duct and is movable to control the flow in the inlet duct.

The present invention is characterized by a variety of merits.

The adaptive, self-controlling design of the device ensures that it automatically adjusts to the respective operating points or operating conditions of the gas turbine. Thus, the supply of cooling-air is accommodated to the actual demand. Accordingly, removal of an excessive air mass from the compressor is avoided. As a consequence, overall efficiency of the gas turbine increases and fuel consumption de-creases accordingly, for example at cruising speed.

The arrangement according to the present invention, therefore, makes use of the pressure differences which occur in the engine in dependence on the respective operating point to control or govern the shut-off element. The present invention accordingly provides for a very simple, mechanical means of control, fully dispensing with additional electronic monitoring or control/governing devices.

In a particularly advantageous form, the shut-off element includes a double-action piston-cylinder unit. Thus, a pressure-controlled metering valve is provided which can have high simplicity of design and construction and high reliability of operation. Shut-off elements of this type enable the individual components of a gas turbine to be separately supplied with cooling air.

The entire arrangement can be manufactured in a very easy and cost-effective way and requires low maintenance effort.

In a particularly favorable design, the piston itself provides the means for flow control. In such a design, additional shut-off elements or similar means are not required. In a favorable form, the piston itself can be brought into the flow area of the inlet duct, or air duct, as a shut-off element to control its cross-section and, thus, the air mass flow.

In an alternative form or development of the present invention, provision can also be made such that the means for flow control can include additional structure to control or govern several inlet ducts. It may in this case be favorable to provide a slider-type element, an annular element or a similar means to enable control of several cooling-air ducts at the same time.

Since the varying pressure differences encountered are used as input variable, the device according to the present invention provides both for continuous and staged control of the cooling-air mass flow.

The device according to the present invention is, therefore, a self-contained control/governing system which does not require external actuation or similar means.

In accordance with the present invention, the device can be used either locally for the control of the cooling-air mass flow of an individual component or for the control of cooling-air flows of a plurality of components, for example cooling-air flows in annuli or the like.

With regard to the underlying technical principle, the amount of the pressure difference is not crucial for the operation of the device.

Summarizing, then, the reduction of the cooling-air mass flows gives rise to an in-creased efficiency of the gas turbine. This provides for lower fuel costs and enables longer flight missions to be executed.

BRIEF DESCRIPTION OF THE DRAWINGS

Further aspects and advantages of the present invention are described by way of the embodiments shown on the accompanying drawings, in which:

FIG. 2 is a highly simplified representation of a first embodiment of the device according to the present invention showing a state of control involving high pressure differences, FIG. 3 is a presentation, analogically to FIG. 2, involving low pressure differences, FIG. 4 is a simplified representation of a further embodiment in the initial state, and FIG. 5 is a presentation, analogically to FIG. 4, in a state with reduced air mass flows.

DETAILED DESCRIPTION OF THE INVENTION

Figure 1:
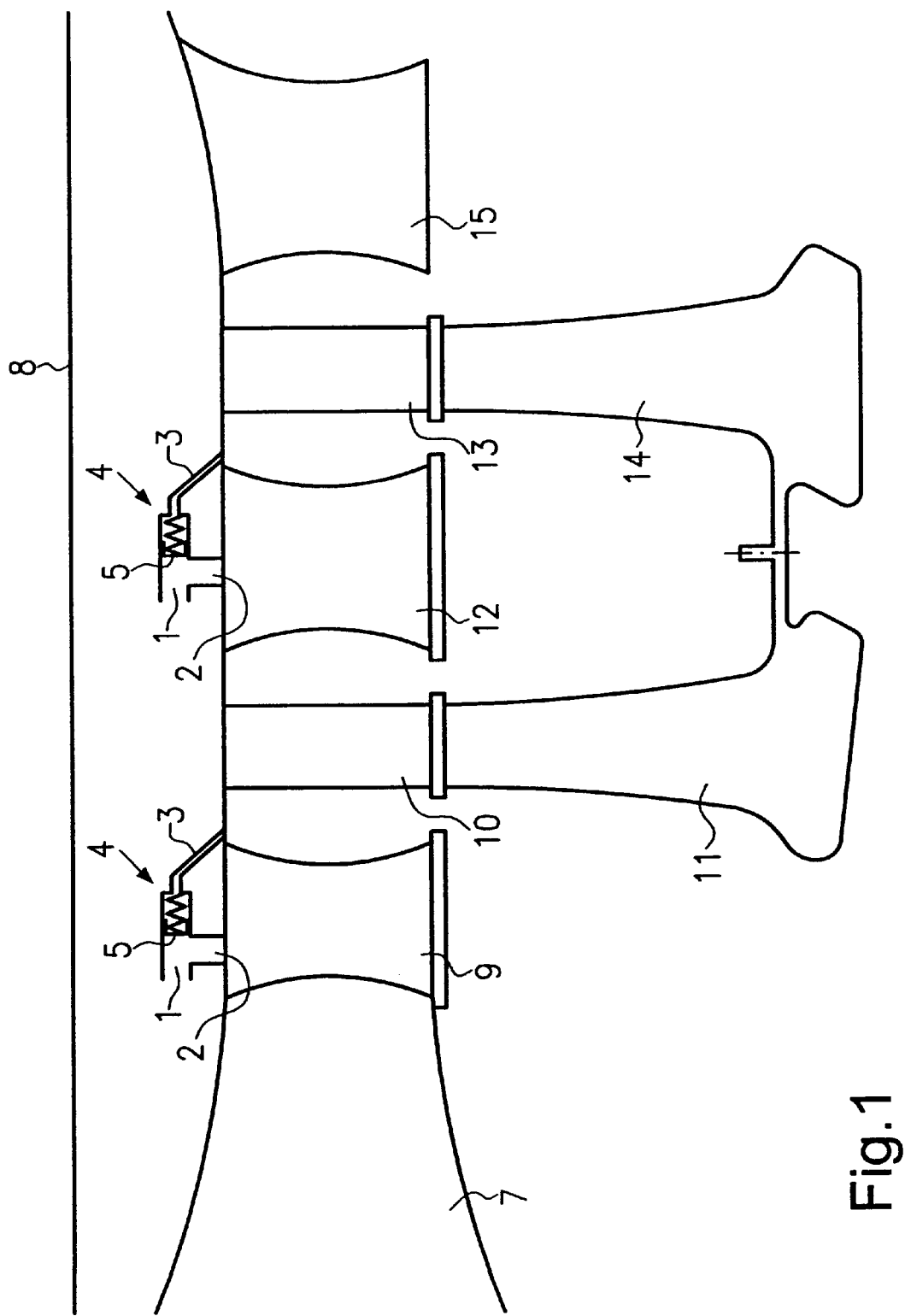
FIG. 1 is a schematic partial sectional view of a partial area of a gas turbine according to the present invention.

FIG. 1 shows, in highly simplified representation, a side view of a partial area of an aircraft gas turbine. A combustion chamber is here indicated by the reference numeral 7. A downstream turbine features a turbine casing 8 within which stator vanes 9 of a first stage and rotor blades 10 of the first stage are shown. The rotor blades 10 are attached to a rotor disk 11 of the first stage in conventional manner. Further in the downstream direction, a stator vane 12 of a second stage is shown which is associated with a rotor blade 13 of the second stage, this rotor blade 13 again being attached to a rotor disk 14 of the second stage. Reference numeral 15 indicates a turbine exit guide vane.

FIG. 1 further shows, in highly simplified form, a piston-cylinder unit 4 which is a part of an embodiment of the device for air mass flow control according to the present invention. The piston-cylinder unit 4 is located in the area of an inlet duct 1, exposed to a cooling air flow, with flow in the inlet duct issuing into an air duct 2 branching off from the inlet duct 1. The inlet duct 1 and air duct 2 may, for example, be used for ducting air from the cooling air flow to cool the stator vanes 9 or 12, respectively.

In the downstream direction, a counter-pressure duct 3 is provided by which pressure, for instance, from the turbine section of the engine, is applied to the rearward area of the piston 5 of the piston-cylinder unit 4.

Furthermore, the piston-cylinder unit 4 comprises a spring 16 by which a suitable pre-load is applied to the piston 5 to bias the piston in the desired direction.

Operation of the invention becomes apparent from FIGS. 2 and 3. FIG. 2 shows a state with a high pressure difference. In this state, the pressure force in the inlet duct 1 exceeds the sum of the pressure force in the counter-pressure duct and of the pre-load force of the spring 16. The piston 5 is accordingly displaced (to the right in FIG. 2) such that the flow area of the air duct 2 is cleared or not obstructed. FIG. 3 then shows an operating condition with a low pressure difference. As a result of the low pressure difference, the pressure force in the counter-pressure duct 3, together with the pre-load force applied by the spring 16, exceeds the pressure force in the inlet duct 1, with the effect that the piston 5 is displaced (to the left in FIG. 3) to partly cover the free cross-section of the air duct 2, thus reducing the supply of air. In the preferred embodiment, flow in the air duct 2 is never completely shut off by the piston 5 so that there is always a minimum air flow through the ducts during operation. Alternatively, the piston can be used to completely shut off flow in the duct. In the embodiment shown, in a relaxed state, the piston is displaced to the left to close off the air duct 2, although this can be reversed if the application so warrants. Further, the shut-off mechanism can be configured to operate in a continuous manner where the piston progressively varies the opening in the duct in response to changes in the pressure differential, or in a digital or staged manner in which the piston is either in a fully open or a fully closed position.

FIGS. 4 and 5 show a further embodiment of the present invention, in which a piston-cylinder unit 4 is similarly applied. Same parts are identified with the same reference numerals. The representation of FIGS. 4 and 5 corresponds, for example, to a front view of the arrangement of FIG. 1. As becomes apparent, a common slider-type element 6 is provided which is coupled to the piston 5. Displacement of the piston involves rotation of the slider-type element enabling it to control or govern the flow area of several air ducts 2, at the same time. In this case, flow in the inlet duct 1 may not issue into the air ducts 2.

It is apparent that a plurality of modifications other than those described herein may be made to the embodiments here shown without departing from the inventive concept and different aspects of the present invention can be combined in different ways to create different embodiments.

What is claimed is:

1. A device for controlling air mass flow in a gas turbine engine, comprising:
   an inlet duct exposed to a first source of pressurized gas;
   an air duct also exposed to the first source of pressurized gas;
   a counter-pressure duct exposed to a second source of pressurized gas;
   a double-action shut-off element which is connected between the inlet duct and the counter-pressure duct and is movable based on pressure differences between the inlet duct and the counter-pressure duct to control flow in the air duct.

2. A device in accordance with claim 1, wherein the shut-off element comprises a double-action piston and cylinder unit.

3. A device in accordance with claim 2, wherein the piston is movable into a flow area of the air duct as a shut-off element.

4. A device in accordance with claim 3, wherein the shut-off element provides for staged control of the air mass flow.

5. A device in accordance with claim 4, wherein the first source of pressurized gas is a cooling air flow of the gas turbine engine and the second source of pressurized gas is a turbine section of the gas turbine engine.

6. A device in accordance with claim 3, wherein the shut-off element provides for continuous control of the air mass flow.

7. A device in accordance with claim 6, wherein the first source of pressurized gas is a cooling air flow of the gas turbine engine and the second source of pressurized gas is a turbine section of the gas turbine engine.

8. A device in accordance with claim 2, and further comprising a slider-type element connected to the shut-off element which is movable into a flow area of the air duct.

9. A device in accordance with claim 8, wherein the slider-type element controls the flow area of several air ducts.

10. A device in accordance with claim 9, wherein the shut-off element provides for staged control of the air mass flow.

11. A device in accordance with claim 10, wherein the first source of pressurized gas is a cooling air flow of the gas turbine engine and the second source of pressurized gas is a turbine section of the gas turbine engine.

12. A device in accordance with claim 9, wherein the shut-off element provides for continuous control of the air mass flow.

13. A device in accordance with claim 12, wherein the first source of pressurized gas is a cooling air flow of the gas turbine engine and the second source of pressurized gas is a turbine section of the gas turbine engine.

14. A device in accordance with claim 1, wherein the shut-off element provides for staged control of the air mass flow.

15. A device in accordance with claim 14, wherein the first source of pressurized gas is a cooling air flow of the gas turbine engine and the second source of pressurized gas is a turbine section of the gas turbine engine.

16. A device in accordance with claim 1, wherein the shut-off element provides for continuous control of the air mass flow.

17. A device in accordance with claim 16, wherein the first source of pressurized gas is a cooling air flow of the gas turbine engine and the second source of pressurized gas is a turbine section of the gas turbine engine.

18. A device in accordance with claim 1, wherein the first source of pressurized gas is a cooling air flow of the gas turbine engine and the second source of pressurized gas is a turbine section of the gas turbine engine.

* * * * *